Jan. 19, 1937. T. S. MONAGHAN 2,068,459

DUST SEPARATOR AND COLLECTOR

Filed June 11, 1935

Inventor
Thomas S. Monaghan,
By Irving R. W. Cathran
Attorney

Patented Jan. 19, 1937

2,068,459

UNITED STATES PATENT OFFICE 2,068,459

DUST SEPARATOR AND COLLECTOR

Thomas S. Monaghan, Chicago, Ill., assignor of one-half to J. B. Peterson, Chicago, Ill.

Application June 11, 1935, Serial No. 26,054

3 Claims. (Cl. 183—89)

This invention relates to dust separators and collectors and has for its object the production of an efficient separator and collector especially designed to produce a maximum amount of separation with a relatively low air pressure. The present invention is an improvement upon my previous Patent #1,723,703, issued August 6, 1929.

One important improvement consists in the conical disc which is suspended from the lower edge of the separating ring which constitutes a partition between the separator and storage bin, the conical disc also providing means for preventing an upward swirl of fines already separated.

Another improvement is the provision of the inwardly and downwardly inclined flange plate adjacent the edge of the cone-shaped disc so placed as to prevent the abrasive dust from cutting the sides of the bottom of the drum.

Other objects and advantages of the present invention will appear throughout the following specification and claims.

In the drawing:—

Figure 1:
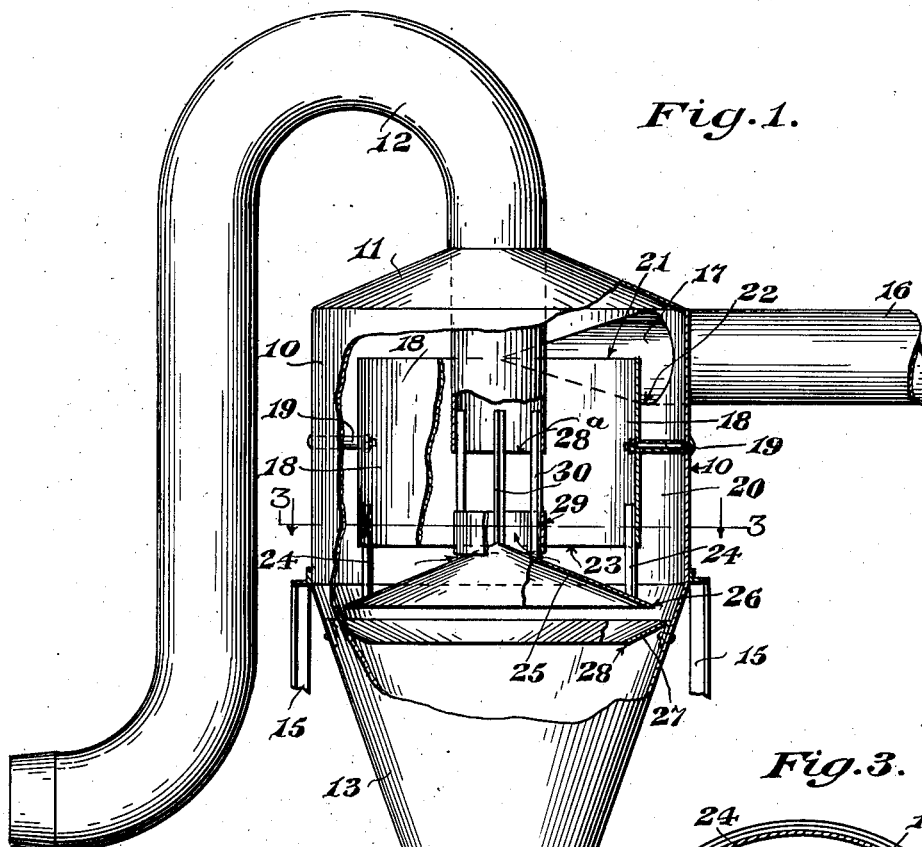
Figure 1 is a side elevation of the improved dust separator and collector, certain parts being shown in vertical section.
Figure 2:
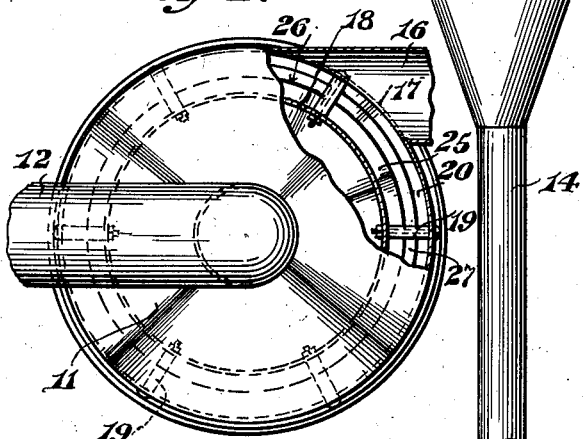
Figure 2 is a top plan view of the structure shown in Figure 1, certain parts being shown in section.
Figure 3:
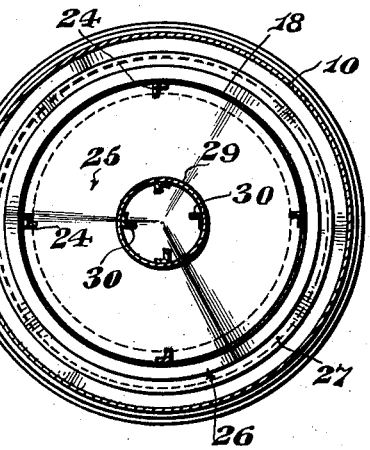
Figure 3 is a transverse sectional view taken on line 3—3 of Figure 1.

By referring to the drawing it will be seen that 10 designates the drum or body which constitutes a substantially cylindrical housing having a frusto-conical top 11 through which extends the outlet pipe or conduit 12, the outlet pipe extending down into the interior of the drum 10, as shown in Figure 1. The drum 10 is provided with an inverted frusto-conical funnel 13 at its lower end which terminates in a discharge spout 14. The body or drum 10 is preferably supported by means of suitable legs 15 which may be of any desired type without departing from the spirit of the invention. An air admission pipe 16 extends tangentially with respect to the drum 10 and communicates with the interior of the drum through the substantially circular portion 17 located at the upper end of the drum 10, and in close proximity to the top 11, as shown in Figure 1.

A separating ring constituting a partition 18 is supported within the drum 10 and is of substantial height. This partition or ring 18 is held in spaced relation with respect to the outer wall of the drum 10 through the medium of the spacing bolts or elements 19. The spacing of the separating ring 18 from the outer wall of the drum 10 in the manner described and illustrated in the drawing, will provide an annular passageway 20. As shown in Figure 1 the upper end 21 of the separating ring 18 extends above the lower edge 22 of the port or opening 17, thereby causing the material entering the drum 10 to be directed in a downward direction into the air passageway 20. The lower edge 23 of the partition or separating ring 18 extends also in close proximity to the upper end of the cone or funnel 13, and a plurality of suspending arms 24 are carried by this separating ring and support a cone-shaped disc 25 in spaced relation from the lower edge 23 of the ring 18. This cone-shaped disc 25 extends in an upward direction toward the center of the separating ring, the apex being in substantial alignment with the lower edge 23 of the ring 18. The outer periphery 26 of the cone-shaped disc 25 preferably extends for a distance beyond the separating ring 18, as shown in Figure 1.

Directly below this cone-shaped disc 25 and secured to the inner faces of the walls of the funnel 13 is a deflector flange plate 27 which flange plate is downwardly and inwardly inclined, the inner periphery 28 extending inwardly for a substantial distance beyond the periphery 26 of the cone 25. This flange plate 27 will constitute a protector means to deflect the material entering the cone and prevent the cutting of the cone by the swirling of the material against the sides of the cone. This plate 27 may be secured in any suitable or desired manner to permit the plate to be removed or replaced should the same become worn at any time. This plate 27 also constitutes a baffle to eliminate a tendency for an up-draft.

The outlet pipe 12 may be of the conventional type and as stated previously, this outlet pipe 12 extends downwardly for a considerable distance within the separating ring or partition 18 to provide an inlet end 28a located at a point substantially mid-way between the upper edge 21 and the lower edge 23 of the separating ring 18. A lower tubular guard 29 is supported slightly above the upper end of the disc 25 and surrounds the cone portion thereof, and this tubular guard 29 is held in spaced relation from the lower inlet end 28a of the outlet pipe 12 by means of the bracing and securing strips 30. It will therefore be seen that there is provided a passageway between the lower edge of the guard 29 and the upper face of the disc 25. Although it may be preferred to have the apex of the disc 25 extend substantially in alignment with the lower edge of the ring 18, it should be understood that the cone may be arranged to extend above or below the lower edge if desired without departing from the spirit of the invention. The disc 25 may also be varied as to its angle, the pitch of the cone being less when used with heavy dust than with light dust, and a cone of greater pitch may be employed without departing from the spirit of the invention. The inlet 28a may also be located at a point substantially midway between the upper edge 21 and the lower edge 23 of the ring 18 as desired, or this may be varied to suit the conditions under which the device may be used.

In operation, the dust laden air will enter the drum 10 through the tangentially arranged air admission pipe 16 and due to the location and arrangement of this pipe 16, the dust laden air will be caused to whirl about the interior of the drum thereby setting the entire air contents of the separator in rotary motion. The dust particles through the attraction of gravity, will fall through the annular passageway 20 and will come into contact with the outer edge of the cone plate 25 and flange plate 27, whereupon the dust particles will then be delivered into the cone 13. The cone-shaped plate 25 will act to direct the air in a stream upwardly and into the inlet opening 28a of the outlet pipe 12 where the air will pass out through the pipe 12. The separated dust which falls into the cone 13 will pass out through the drain tube 14.

The arrangement, location and structure of the separating ring or partition 18 is an important element in the present invention and because of its arrangement, as illustrated and described, the gases or dust laden air entering the drum through the pipe 16 will follow a downward centrifugal motion and the gas or dust laden air will be forced against the outer side of the ring or partition 18, the heavy particles then dropping upon the cone plate 25 and then upon the flange plate 27, and finally into the funnel 13, the air passing as described out through the pipe 12 after entering the opening 28a. The disc 25 is of substantial size and the outer periphery 26 is arranged in close proximity to the wall of the funnel 13 and extends beyond the wall of the separating ring 18. This disc will constitute a partition between the separator or drum 10 and the storage bin communicating with the funnel 13. The flange plate 27 will, as stated above, constitute a protecting means to prevent the cutting of the walls of the cone by action of the abrasive dust, and will tend to keep the dust in the air as well as tend to prevent an up-draft close to the sides of the funnel. Separation takes place in the space between the top of the tubular guard plate 29 and the lower outer edge 26 of the cone-shaped disc 25 because of a drop in velocity and also because of the centrifugal motion on the surface of the disc 25 and more particularly at the outer edge of the disc 25. This disc 25 also constitutes a means for preventing an upward swirl of fines which have already been separated.

It should be understood that certain detail changes in the mechanical construction, combination and arrangement of parts may be employed without departing from the spirit of the invention, so long as such changes fall within the scope of the appended claims.

Having described the invention, what is claimed as new is:—

1. In a dust separator of the class described, a drum, an outlet conduit communicating with the top of said drum, an air admission pipe communicating with the drum near the top thereof, an elongated separating partition extending to a point near the top of said drum and above the bottom of said air admission pipe for producing a down draft, said conduit having an entrance opening located below the upper edge of said partition, a substantial cone-shaped disc arranged in spaced relation below said separating partition and having its edge extending laterally beyond the walls of said partition, and an inwardly extending downwardly inclined flange plate located below and in spaced relation from the edge of said cone-shaped disc, said drum provided with a funnel at its lower end, and said flange plate being secured to the wall of said funnel to constitute a protector therefor.

2. In a dust separator of the class described, a drum, an outlet conduit communicating with the top of said drum, an air admission pipe communicating with the drum near the top thereof, an elongated separating partition extending to a point near the top of said drum and above the bottom of said air admission pipe for producing a down draft, said conduit having an entrance opening located below the upper edge of said partition, a substantial cone-shaped disc arranged in spaced relation below said separating partition and having its edge extending laterally beyond the walls of said partition, an inwardly extending downwardly inclined flange plate located below and in spaced relation from the edge of said cone-shaped disc, said drum provided with a funnel at its lower end, said flange plate being secured to the wall of said funnel to constitute a protector therefor, and a tubular guard carried by said cone-shaped disc and arranged in spaced relation from the lower end of said conduit.

3. In a dust separator of the class described, a drum, an outlet pipe communicating with the top of said drum, said drum being substantially frusto-conical, an air admission pipe communicating with said drum near the top thereof and having a substantially circular entrance opening communicating with the interior of the drum, a separating ring supported in spaced relation with respect to the walls of said drum and having its upper edge extending in close proximity to the top of the drum and for a material distance above the lower edge of said circular entrance opening, the separating ring extending also for a material length throughout the drum to provide an air passage between the separating ring and the wall of the drum whereby a comparative dead air space will be produced in the top of the drum, a deflecting cone suspended below said separating ring for directing the air in an upward direction and deflecting heavy particles of dust downwardly, said outlet pipe having an entrance opening located at a material distance below the upper edge of said separating ring whereby air will be deflected from the cone disc upwardly into the opening formed in said outlet pipe, a cone formed upon the lower end of said drum, and a protector deflecting plate carried by said cone in spaced relation and extending inwardly with respect to the edge of said cone.

THOMAS S. MONAGHAN.